(12) United States Patent
Rule et al.

(10) Patent No.: US 12,243,006 B2
(45) Date of Patent: Mar. 4, 2025

(54) AUTONOMOUS DELIVERY VEHICLE DECISIONING TO ENABLE SECURE AND EFFICIENT ORDER FULFILLMENT

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 329 days.

(21) Appl. No.: 17/662,877

(22) Filed: May 11, 2022

(65) Prior Publication Data
US 2023/0368128 A1    Nov. 16, 2023

(51) Int. Cl.
*G06Q 10/087* (2023.01)
*B60W 60/00* (2020.01)
(Continued)

(52) U.S. Cl.
CPC ..... *G06Q 10/087* (2013.01); *B60W 60/00256* (2020.02); *G06Q 10/047* (2013.01);
(Continued)

(58) Field of Classification Search
CPC ............... G06Q 10/087; G06Q 10/047; G06Q 10/0832; G06Q 10/0833; G06Q 10/08;
(Continued)

(56) References Cited

U.S. PATENT DOCUMENTS

2017/0076277 A1    3/2017    Zhou et al.
2019/0033856 A1*   1/2019    Ferguson ........... G07C 9/00896
(Continued)

FOREIGN PATENT DOCUMENTS

EP    4020360 A1    6/2022

OTHER PUBLICATIONS

International Search Report and Written Opinion for Application No. PCT/US2023/020480, mailed on Aug. 4, 2023, 11 Pages.
(Continued)

*Primary Examiner* — Garcia Ade
(74) *Attorney, Agent, or Firm* — Harrity & Harrity, LLP

(57) ABSTRACT

In some implementations, an autonomous vehicle may receive information associated with an order including multiple items. The autonomous vehicle may, after traveling to a first pickup location and obtaining a subset of the items in the order, identify one or more alternative pickup locations having respective inventories including one or more items that are unavailable at the first pickup location. The autonomous vehicle may generate one or more virtual credentials linked to a primary credential associated with a user that submitted the order and use the one or more virtual credentials to obtain, at each alternative pickup location, one or more items that were unavailable at the first pickup location. The autonomous vehicle may travel to a final destination to deliver the subset of the multiple items obtained from the first pickup location and the one or more items obtained from each of the one or more alternative pickup locations.

20 Claims, 5 Drawing Sheets

(51) Int. Cl.
  *G06Q 10/047* (2023.01)
  *G06Q 10/0832* (2023.01)
  *G06Q 10/0833* (2023.01)
  *H04W 4/021* (2018.01)

(52) U.S. Cl.
  CPC ..... *G06Q 10/0832* (2013.01); *G06Q 10/0833* (2013.01); *H04W 4/021* (2013.01)

(58) Field of Classification Search
  CPC .... G06Q 20/18; G06Q 20/20; G06Q 30/0639; G06Q 20/12; G06Q 20/34; G06Q 30/0635; B60W 60/00256; H04W 4/021; H04W 4/40; G01C 21/343
  USPC .......................................................... 705/28
  See application file for complete search history.

(56) References Cited

U.S. PATENT DOCUMENTS

| | | | |
|---|---|---|---|
| 2022/0092541 A1* | 3/2022 | Cacioppo | G06Q 10/08 |
| 2022/0207526 A1* | 6/2022 | Wieker | H04W 12/068 |
| 2022/0237530 A1* | 7/2022 | Franey | G06Q 10/047 |

OTHER PUBLICATIONS

"Autonomous Delivery Vehicles for Last-Mile Delivery: An Overview," PackageX, Nov. 8, 2021, 7 pages. [Retrieved from https://packagex.io/blog/technology/autonomous-delivery-vehicles/].

UELAND, "10 Autonomous Robots for Last-mile Deliveries," PracticalEcommerce, Jun. 28, 2021, 7 pages. [Retrived from https://www.practicalecommerce.com/10-autonomous-robots-for-last-mile-deliveries].

* cited by examiner

AUTONOMOUS DELIVERY VEHICLE DECISIONING TO ENABLE SECURE AND EFFICIENT ORDER FULFILLMENT

BACKGROUND

An autonomous vehicle, also known as a self-driving car, a driverless car, or a robotic car, is a vehicle that can sense a surrounding environment and move safely with little or no human input. Autonomous vehicles generally combine inputs from various sensors to perceive surroundings, and advanced control systems interpret sensory information to identify appropriate navigation paths as well as obstacles and relevant signage. Autonomous vehicles are expected to impact multiple industries and many aspects of daily life and have been the subject of significant research regarding their environmental, practical, and lifestyle consequences. For example, possible implementations of autonomous vehicle technologies include personal self-driving vehicles, shared robotaxis, and connected vehicle platoons. Another possible implementation of autonomous vehicle technologies relates to autonomous delivery operations (e.g., where a driverless car or an aerial drone is used to deliver packages, goods, or other items).

SUMMARY

Some implementations described herein relate to a system associated with an autonomous vehicle for secure and efficient order fulfillment. The system may include one or more memories and one or more processors communicatively coupled to the one or more memories. The one or more processors may be configured to receive information associated with an order that includes multiple items to obtain from a first pickup location and deliver to a final destination. The one or more processors may be configured to determine, after the autonomous vehicle has traveled to the first pickup location and obtained a subset of the multiple items in the order, one or more remaining items in the order that are unavailable at the first pickup location. The one or more processors may be configured to identify one or more alternative pickup locations having respective inventories that include the one or more remaining items. The one or more processors may be configured to generate one or more virtual credentials linked to a primary credential associated with a user that submitted the order. The one or more processors may be configured to use, at the one or more alternative pickup locations, the one or more virtual credentials to obtain, at each of the one or more alternative pickup locations, the one or more remaining items that satisfy one or more fulfillment conditions. The one or more processors may be configured to cause the autonomous vehicle to travel to the final destination to deliver the subset of the multiple items obtained from the first pickup location and the one or more remaining items obtained from the one or more alternative pickup locations.

Some implementations described herein relate to a method for secure and efficient order fulfillment. The method may include receiving, by an autonomous vehicle system, information associated with an order that includes multiple items to deliver to a final destination. The method may include identifying, by the autonomous vehicle system, at least a first pickup location having an inventory that includes one or more first items in the order and a second pickup location having an inventory that includes one or more second items in the order. The method may include generating, by the autonomous vehicle system, at least a first virtual credential and a second virtual credential linked to a primary credential associated with a user that submitted the order, wherein the first virtual credential is bound to a first entity associated with the first pickup location and the second virtual credential is bound to a second entity associated with the second pickup location. The method may include using, by the autonomous vehicle system, at the first pickup location, the first virtual credential to obtain, at the first pickup location, the one or more first items in the order. The method may include using, by the autonomous vehicle system, at the second pickup location, the second virtual credential to obtain, at the second pickup location, the one or more second items in the order. The method may include causing, by the autonomous vehicle system, the autonomous vehicle to travel to the final destination to deliver the one or more first items obtained from the first pickup location and the one or more second items obtained from the second pickup location.

Some implementations described herein relate to a non-transitory computer-readable medium that stores a set of instructions that, when executed by one or more processors of an autonomous vehicle system, cause the autonomous vehicle system to receive information associated with an order that includes multiple items that the autonomous vehicle is to obtain and deliver to a final destination. The set of instructions, when executed by one or more processors of the autonomous vehicle system, may cause the autonomous vehicle system to determine, after the autonomous vehicle has traveled to a first pickup location and obtained a subset of the multiple items in the order, one or more remaining items in the order that are unavailable at the first pickup location. The set of instructions, when executed by one or more processors of the autonomous vehicle system, may cause the autonomous vehicle system to identify a second pickup location having an inventory that includes the one or more remaining items. The set of instructions, when executed by one or more processors of the autonomous vehicle system, may cause the autonomous vehicle system to generate a virtual credential linked to a primary credential associated with a user that submitted the order. The set of instructions, when executed by one or more processors of the autonomous vehicle system, may cause the autonomous vehicle system to use, at the second pickup location, the virtual credential to obtain the one or more remaining items from the inventory of the second pickup location. The set of instructions, when executed by one or more processors of the autonomous vehicle system, may cause the autonomous vehicle to travel to the final destination to deliver the subset of the multiple items obtained from the first pickup location and the one or more remaining items obtained from the second pickup location.

DETAILED DESCRIPTION

Figure 1A:
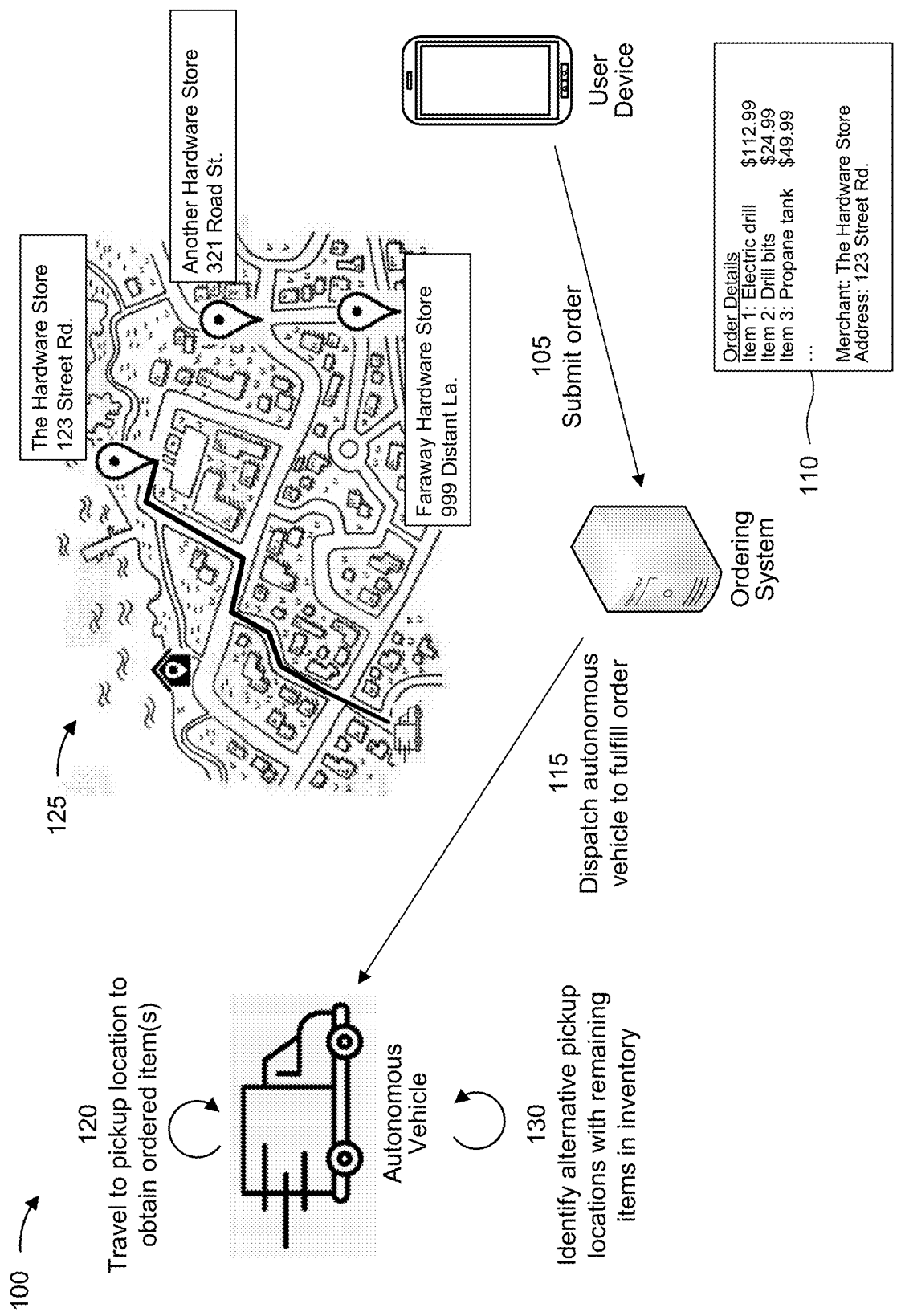
FIGS. 1A-1B are diagrams of an example implementation associated with autonomous delivery vehicle decisioning to enable secure and efficient order fulfillment.

The following detailed description of example implementations refers to the accompanying drawings. The same reference numbers in different drawings may identify the same or similar elements.

Recent advances in technology have led to increased interest in autonomous vehicles that allow a computing system to operate, at least under some conditions, control elements on a vehicle without any assistance from a human driver. For example, various sensors (e.g., cameras, radar, lidar, sonar, global navigation satellite system (GNSS) receivers, odometry, and/or inertial measurement units) can be installed on an autonomous vehicle to detect surroundings of the vehicle on a roadway (e.g., objects encountered while the autonomous vehicle is traveling), which can be used in combination with software algorithms and a completely automated driving system to navigate roadways without any human mediation. Due to various socioeconomic factors, one area where there is likely to be a significant increase in demand for autonomous vehicle technologies relates to autonomous delivery services. For example, factors that are driving demand for autonomous delivery vehicles include shorter expected delivery times (e.g., including same-day delivery), an increase in the number of electronic commerce customers, increases in population, greater diversity in the products that are sold for delivery by electronic commerce companies and/or brick-and-mortar retailers (e.g., groceries, retail goods, and/or medical supplies, among other examples), increased demand for contactless delivery (e.g., due to social distancing norms and/or changes in consumer lifestyles), and/or a limited supply of human labor to operate delivery vehicles, among other examples.

However, existing efforts to leverage autonomous delivery vehicles are generally limited to last-mile delivery services. For example, in an order fulfillment context, last-mile delivery generally refers to movement of goods from a fulfillment location (e.g., a warehouse, transportation hub, or retail store, among other examples) to a final delivery destination, which is typically a customer doorstep. Using autonomous delivery vehicles for last-mile delivery may offer faster delivery times, improved fuel economy due to lower fuel consumption, increased productivity due to reduced reliance on human labor and a capability to work longer hours without breaks, less pollution and emissions, and/or reduced traffic congestion on roadways, among other examples. However, supply chain challenges are not limited to efficiently transporting goods from a fulfillment location to a final delivery destination. For example, in many cases, a consumer may have a desire to order several products to be delivered, but some items may be out-of-stock or otherwise unavailable at a given fulfillment location. In such cases, the consumer may have to place separate orders to obtain the unavailable items from other locations, which may increase the number of last-mile deliveries that need to be performed and thereby undermine the potential efficiencies of autonomous delivery vehicles.

Some implementations described herein relate to techniques whereby an autonomous delivery vehicle may be equipped with decisioning logic to efficiently and securely fulfill an order by obtaining items in the order from different locations before delivering the items to a final destination (e.g., a customer doorstep). For example, a user may interact with an ordering system to place an order to obtain multiple items from a pickup location (e.g., an electronic commerce retailer, a grocery store, a hardware store, a medical equipment supplier, and/or an auto parts supplier, among other examples), and the ordering system may dispatch an autonomous vehicle to the pickup location to fulfill the order. In some implementations, based on a determination that one or more items in the order are unavailable at the pickup location, the autonomous vehicle may reference information related to available inventories to identify one or more alternative pickup locations where the unavailable items can be obtained.

Accordingly, in some implementations, the autonomous vehicle may be configured to generate one or more virtual credentials (e.g., secure payment credentials that may be linked to a primary payment credential and used as a substitute for the primary payment credential), which may be used in one or more transactions to obtain the unavailable items from the one or more alternative pickup locations. Furthermore, in addition to using virtual credentials that may be less susceptible to fraud (e.g., by avoiding exposure of the primary payment credential and/or by binding each credential to a specific merchant or transaction amount), the user may specify one or more parameters to minimize fraud associated with the transactions that the autonomous vehicle performs or otherwise facilitates at the alternative pickup location(s). For example, the user may specify a price limit or other criteria to limit a maximum amount that can be spent to obtain the items from the alternative pickup location (s), may specify whether alternative products or substitutions are permitted or not permitted, and/or may specify a geofence to limit the range that the autonomous vehicle can travel to obtain items from the alternative pickup locations, among other examples. Furthermore, in some implementations, the autonomous vehicle may use various techniques to calculate an optimum route to obtain the items from the alternative pickup locations and/or minimize the number of alternative pickup locations that are visited, may calculate a remaining internal volume, or capacity, within the autonomous vehicle to determine whether items available at a next location will fit within the remaining internal volume, and/or may transport items obtained at different locations in different secure areas to prevent items obtained at one location from being accessed at subsequent locations.

In this way, some implementations described herein may increase efficiency associated with deliveries that are made using autonomous vehicles by enabling an autonomous delivery vehicle to travel an optimum route to shop around at multiple pickup locations and make a single delivery that includes items obtained from multiple pickup locations. In this way, some implementations described herein may reduce a number of deliveries that need to be made to a final destination, which can increase fuel efficiency, enable faster delivery, reduce traffic congestion on roadways, and/or reduce pollution caused by emissions, among other examples. Furthermore, by using a virtual credential (e.g., a virtual card number (VCN)) that is linked or otherwise associated with a primary credential (e.g., a credit card number), allowing the user to specify criteria or other limitations on the transactions that can be made at the alternative locations, and/or transporting items obtained at different locations in separate secure areas on the autonomous vehicle, some implementations described herein may reduce a fraud risk and/or improve security associated with order fulfillment at multiple pickup locations.

Figure 1B:
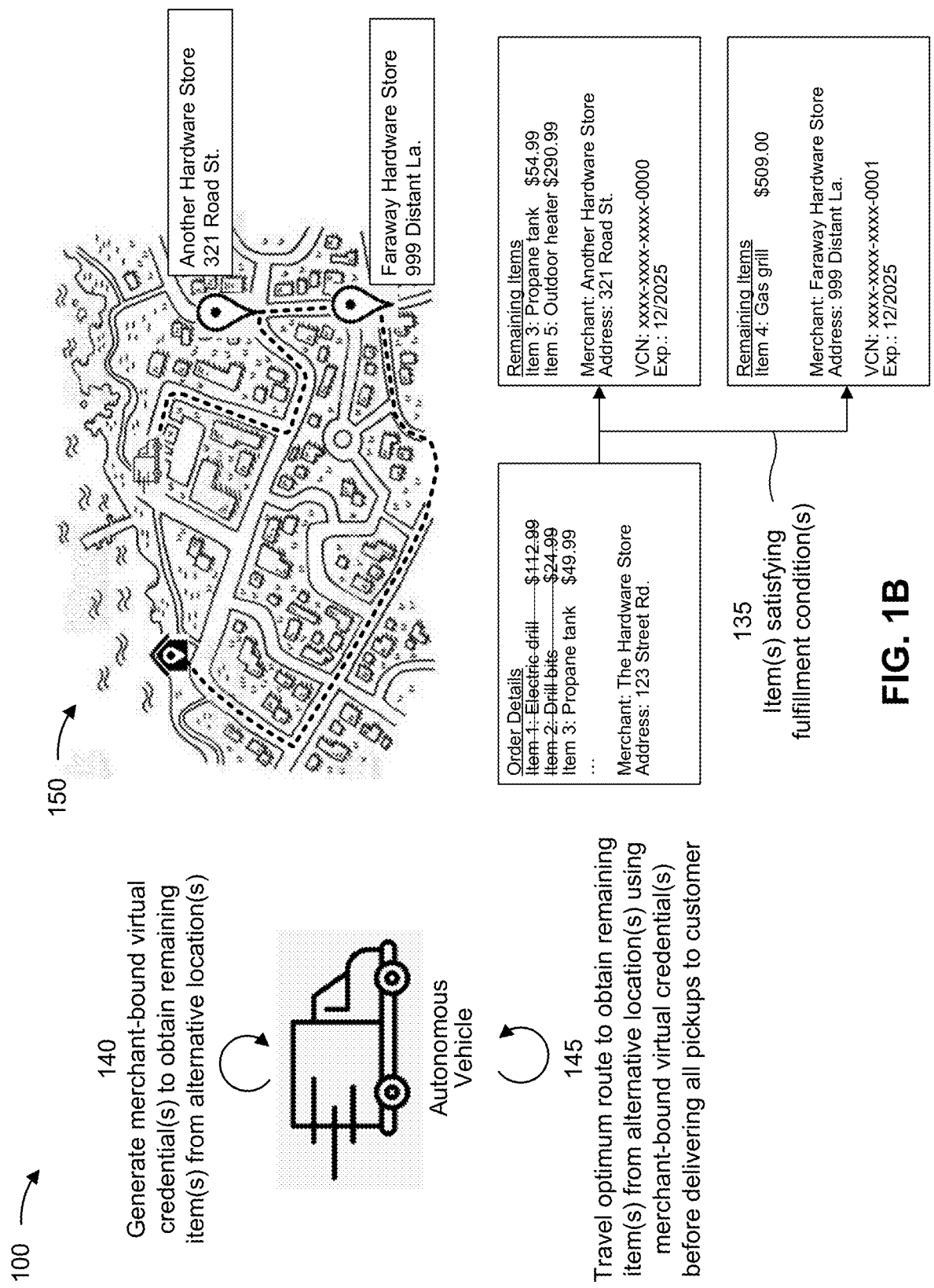

FIGS. 1A-1B are diagrams of an example 100 associated with autonomous delivery vehicle decisioning to enable secure and efficient order fulfillment. As shown in FIGS. 1A-1B, example 100 includes a user device, an ordering system, and an autonomous vehicle. The user device, the ordering system, and the autonomous vehicle are described in more detail in connection with FIG. 2 and FIG. 3.

As shown in FIG. 1A, and by reference number 105, the user device may communicate with the ordering system to submit an order that includes multiple items to be obtained from a pickup location. For example, in some implementations, the ordering system and/or the pickup location may be associated with a retail store, a grocery store, an electronic commerce retailer, a medical supplier, a pickup and delivery service, and/or a courier service, among other examples. For example, in some implementations, the ordering system may be associated with a website that may be displayed in a browser on the user device and/or a mobile application that may execute on the user device, whereby a user may interact with a user interface on the user device to purchase or otherwise obtain various items from a specified pickup location. For example, in FIG. 1A, reference number 110 depicts an example where the ordering system is associated with a merchant that operates a hardware store, and the user device interacts with the user interface to authorize a transaction to obtain various items (e.g., an electric drill, a set of drill bits, a propane tank, and/or other items) from a location associated with the hardware store. In some implementations, the ordering system may be associated with a merchant that operates a single location or a merchant that operates multiple locations (e.g., a chain store). In some implementations, in cases where the ordering system is associated with multiple locations, the user may interact with the user interface to select a specific pickup location from which the items are to be obtained (e.g., a location that is closest to a final delivery destination and/or a location where certain items are listed as being in-stock or otherwise available). Accordingly, as described herein, the user may generally interact with the ordering system, via the user interface shown on the user device, to submit an order that includes multiple items to be obtained from a pickup location and delivered to a final destination.

In some implementations, when submitting the order through the ordering system, the user may provide a payment credential to use in a transaction for the ordered items (e.g., a credit card number and related information, such as an expiration date and card verification value (CVV)) and the user may further specify the final destination where the ordered items are to be delivered (e.g., a customer doorstep or parcel locker). Furthermore, as described herein, the ordering system may offer a shop-around service or a multi-location fulfillment service, whereby any items in the order that are unavailable at the pickup location specified or otherwise selected by the user may be obtained from one or more alternative pickup locations. For example, in some cases, inventory information or in-stock (or out-of-stock) status information that the ordering system presents to the user device may not accurately reflect whether certain items are actually available at a specific pickup location, where an out-of-stock status may not be discovered until the item cannot be found during an attempt to fulfill the order at the pickup location (e.g., where the ordered items include one or more fast-moving consumer goods, which refers to products that are in high-demand and sold quickly, such as packaged foods, over-the-counter drugs, dry goods, and other consumables). Additionally, or alternatively, a group of items that the user desires to purchase may include some items that are available only at a first location and other items that are available only at a second location, where the first location and the second location may be affiliated (e.g., different locations of the same chain store) or unaffiliated (e.g., associated with different merchants). More generally, in an online ordering context, there are various circumstances in which a user may desire to purchase or otherwise obtain a collection of items that may not all be available at a single pickup location.

Accordingly, the ordering system may offer the shop-around service or multi-location fulfillment service to provide the user with an option to obtain one or more items in the order from an alternative pickup location in the event that one or more items in the order are unavailable at the pickup location specified by the user. In some implementations, in cases where the user selects the option to obtain unavailable items from one or more alternative pickup locations when submitting the order to the ordering system, the user may further specify one or more criteria or conditions for obtaining unavailable items at alternative pickup locations. For example, in some implementations, the user may authorize the ordering system to generate one or more virtual credentials to be used to enter into transactions at the alternative pickup locations. In particular, as described herein, a virtual credential, sometimes referred to as a virtual payment credential, a virtual card number, and/or a virtual credit card, is a computer-generated version of a primary payment credential (e.g., a credit card number) that may be linked to the primary payment credential and used as a substitute for the primary payment credential in a transaction. For example, a financial institution may issue a transaction card (e.g., a credit card) to a person, company, or organization, and a transaction management system of the financial institution may also issue one or more virtual card numbers that can be used with different merchant transaction systems. For example, a first virtual credential may be usable with a first merchant only, a second virtual credential may be useable with a second merchant only, and so on.

Accordingly, because virtual credentials can generally be used in the same way as an actual credit card, virtual credentials can offer increased security in online transactions that occur in a context where a physical transaction card is not required or physically presented to a merchant. For example, if a security breach were to result in a first virtual credential being exposed or otherwise compromised (e.g., to a hacker or fraudster), the virtual credential could be used only at the particular merchant and would be unusable with any other merchant(s). In this way, using the virtual credential in an online transaction may reduce a risk that, and/or an extent to which, the virtual credential can be fraudulently used, thereby improving information security. For example, a compromised virtual credential may be invalidated and a new virtual credential may be generated without affecting the primary payment credential and/or any other virtual credentials that may be linked to the primary payment credential. Accordingly, as described herein, the user may authorize the ordering system to generate virtual credentials or communicate with a financial institution or other transaction system to generate virtual credentials that may be used to conduct transactions at the alternative pickup locations. Furthermore, in some implementations, the user may specify one or more creation and/or approval criteria for the virtual credentials. For example, the user may indicate alternative pickup locations where the ordering system is pre-approved to create and use virtual credentials (e.g., alternative locations associated with the same merchant). In other examples, the user may indicate one or more alternative pickup locations where the ordering system is not permitted to create and use virtual credentials (e.g., stores that the user does not wish to patronize for any reason) and/or indicate that specific approval of the user is required before the ordering system is permitted to create and use a virtual credential at an alternative pickup location.

In some implementations, in addition to specifying one or more criteria and/or conditions associated with creating and/or using virtual credentials to obtain ordered items from alternative pickup locations, the user may specify one or more fulfillment conditions for obtaining the ordered items from the alternative pickup locations. For example, in some implementations, the user may specify a maximum cost associated with obtaining an item from an alternative location, where the maximum cost may be the cost of the item at the primary pickup location specified by the user or a cost that does not exceed a threshold that may be based on the cost of the item at the primary pickup location (e.g., no more than a specified percentage or a specified amount greater than the cost of the item at the primary pickup location). Additionally, or alternatively, the one or more fulfillment conditions may indicate whether substitutions are authorized for one or more items (e.g., an electric drill that has similar specifications as the drill ordered by the user) and/or may indicate specific substitutions that are authorized for one or more items. Additionally, or alternatively, the one or more fulfillment conditions may define a geofence, whereby any alternative pickup locations may be required to be within the geofence.

As further shown in FIG. 1A, and by reference number 115, the ordering system may dispatch an autonomous vehicle to fulfill the order. For example, in some implementations, the autonomous vehicle may be a sidewalk vehicle designed to travel at low speeds (e.g., four to six kilometers per hour, or walking speed), which increases safety and gives remote teleoperators (if any) sufficient time to take control of the autonomous vehicle in case of emergency. Alternatively, in some implementations, the autonomous vehicle may be an on-road delivery van or vehicle, which may run on electric power and have sensor systems and algorithms that are similar to autonomous cars. Alternatively, in some implementations, the autonomous vehicle may be a delivery drone (e.g., an unmanned aerial vehicle) used to transport packages, medical supplies, food, or other goods. Furthermore, as autonomous vehicle technologies continue to progress, the autonomous vehicle may be equipped with increasingly sophisticated sensors and/or algorithms to navigate roadways and/or airways independently, with or without assistance or oversight by a remote teleoperator. Furthermore, as described herein, the autonomous vehicle may include one or more structural components or design features to enable secure and efficient order fulfillment. For example, in some implementations, the autonomous vehicle may include one or more secure compartments where items are held while being transported by the autonomous vehicle and/or a communication interface to transfer payment information or otherwise conduct a transaction (e.g., using a merchant-bound virtual credential) at a point-of-sale, among other examples.

As further shown in FIG. 1A, and by reference number 120, the autonomous vehicle may travel to the pickup location specified in the order to obtain the items ordered by the user. When the autonomous vehicle is dispatched by the ordering system, the ordering system may communicate information related to the order to the autonomous vehicle, which may use the information received from the ordering system to fulfill the order. For example, the ordering system may provide an address or other information related to the location where the items are to be picked up, an address or other information related to a final destination where the items in the order are to be delivered, information related to the items included in the order, and/or information related to a payment credential that was provided in the order. For example, as shown by reference number 125, the autonomous vehicle may calculate an optimal route to the pickup location specified by the user, and may travel to the specified pickup location along the optimal route. In some implementations, the optimal route to the specified pickup location may be a shortest path, a fastest path, a most direct path (e.g., a path with the fewest turns and/or traffic signals), and/or a path with no tolls or the fewest tolls, among other examples. Furthermore, in some implementations, the optimal route may be based on one or more traveling constraints associated with the autonomous vehicle, such as a maximum speed (e.g., no more than 40 kilometers per hour), avoiding precipitation, avoiding areas with high pedestrian densities, avoiding highways, only traveling on roadways with a speed limit that satisfies (e.g., is less than or equal to) a threshold, and/or only traveling within a geofence (e.g., a geographically limited area where the autonomous vehicle is permitted to travel, such as a city or region covered by a permit indicating where the autonomous vehicle is permitted to travel).

As further shown in FIG. 1A, and by reference number 130, the autonomous vehicle (or the ordering system) may identify one or more alternative pickup locations based on a determination that one or more items in the order are unavailable at the pickup location specified by the user. For example, after the autonomous vehicle has traveled to the specified pickup location and obtained a subset of the items in the order, the autonomous vehicle may identify one or more items in the order that were unavailable at the specified pickup location. Accordingly, the autonomous vehicle and/or the ordering system may reference one or more data sources that include information related to alternative pickup locations where one or more remaining items in the order are in an inventory, in-stock, and/or otherwise available. For example, in some implementations, the ordering system may have a relationship with one or more pickup locations and may reference live inventory information associated with such pickup locations (e.g., the ordering system may be associated with an electronic commerce website that is integrated with a grocery store chain that has many brick-and-mortar locations, whereby the ordering system can consult an inventory system of the grocery chain to identify items that are available at alternative pickup locations). Additionally, or alternatively, the autonomous vehicle and/or ordering system may obtain the information related to items that are included in an inventory, in-stock, or otherwise available from other suitable data sources, such as searching one or more websites or other online data sources. Accordingly, in cases where the user has selected the option to enable multi-location order fulfillment, the autonomous vehicle or the ordering system may attempt to identify one or more alternative pickup locations from which to obtain one or more remaining items in the order that were unavailable at the initially specified pickup location.

In some implementations, as described herein, the autonomous vehicle may be configured to travel to one or more alternative pickup locations to obtain remaining items in the order based on the items available at the alternative pickup locations satisfying one or more fulfillment conditions. For example, as described above, the user may specify conditions such as a maximum cost for obtaining an item from an alternative pickup location (e.g., no more than a specified percentage or a specified amount greater than the cost of the item at the specified pickup location) and/or one or more substitution rules (e.g., whether substitutions of different items are permitted and/or specific substitutions that are permitted or not permitted). For example, in FIG. 1B, reference number 135 depicts an example where the autonomous vehicle travels to a hardware store where a user has placed an order for an electric drill, a set of drill bits, a propane tank, a gas grill, and an outdoor heater. In the depicted example, the electric drill and the drill bits were available at the specified pickup location, but the propane tank, gas grill, and outdoor heater were unavailable. In this example, two remaining items (e.g., the propane tank and outdoor heater) are available at a first alternative pickup location and a third remaining item (e.g., the gas grill) is available at a second alternative pickup location. Accordingly, based on these remaining items satisfying any applicable fulfillment conditions (e.g., maximum cost, substitution conditions, and/or other suitable conditions), the autonomous vehicle may be configured to obtain the remaining items from the alternative pickup locations. However, any items available at an alternative pickup location that fail to satisfy any applicable fulfillment conditions (e.g., exceeding a maximum cost) may not be obtained from the alternative pickup locations. Furthermore, in some implementations, the autonomous vehicle and/or the ordering system may minimize a number of alternative pickup locations that are visited to obtain remaining items that were unavailable at the initial pickup location (e.g., attempting to locate all or as many remaining items as possible from a single alternative location and/or limiting alternative pickup locations that cause more than a threshold deviation from an optimal route, among other examples).

As further shown in FIG. 1B, and by reference number 140, the autonomous vehicle may generate one or more merchant-bound virtual credentials to obtain one or more remaining items in the order from the one or more alternative pickup locations. For example, as described herein, the autonomous vehicle may identify alternative pickup locations where the remaining items are available subject to a geofence that may limit an area where the autonomous vehicle is permitted to travel and/or any fulfillment conditions that must be satisfied to obtain the remaining items from the alternative pickup locations. In some implementations, after identifying the alternative pickup locations to be visited, the autonomous vehicle may generate one or more merchant-bound virtual credentials associated with the alternative pickup locations. For example, the merchant-bound virtual credentials may be linked to a primary payment credential provided by the user, and each virtual credential may be valid only for a merchant associated with a specific alternative pickup location. Additionally, or alternatively, the virtual credential may be associated with a transaction limit or a specific transaction value (e.g., based on the cost of the remaining items to be obtained from the next alternative pickup location), which may reduce a potential fraud risk. Furthermore, in some implementations, a message may be sent to the user device when a virtual credential is created (e.g., by the autonomous vehicle, the ordering system, or a financial institution that communicates with the autonomous vehicle or the ordering system), where the message may indicate that the virtual credential was created and provide the user with an option to approve or modify one or more parameters associated with the use of the virtual credentials. For example, the user may approve the authorized amount associated with the virtual credentials, approve use of the virtual credentials at the alternative pickup locations, and/or deny use of the virtual credentials at the alternative pickup locations.

In some implementations, as shown by reference number 145, the autonomous vehicle may travel an optimum route to the alternative pickup location(s) to obtain one or more remaining items in the order using the merchant-bound virtual credentials. For example, after identifying the alternative pickup locations where the remaining items are available and receiving any feedback from the user device to approve, reject, and/or modify the parameters for using the virtual credentials, the autonomous vehicle may calculate the optimum route to travel to the one or more alternative pickup locations before traveling to the final delivery destination. For example, as described elsewhere herein, the optimum route may be a shortest total path, a fastest total path, a most direct path, a most energy-efficient or fuel-efficient path, and/or a path with no tolls or the fewest tolls, among other examples. Furthermore, the optimum route may be based on one or more traveling constraints associated with the autonomous vehicle, such as a maximum speed, avoiding precipitation, avoiding areas with high pedestrian densities, avoiding highways, only traveling on roadways with a speed limit that satisfies (e.g., is less than or equal to) a threshold, and/or only traveling within a geofence (e.g., a geographically limited area where the autonomous vehicle is permitted to travel, such as a city or region covered by a permit indicating where the autonomous vehicle is permitted to travel). Additionally, or alternatively, the optimum route may be based on parameters or factors related to the type of items obtained at the initial pickup location and/or subsequent pickup locations (e.g., frozen food or other perishable items), time required to travel to the alternative pickup locations (e.g., to prevent the perishable items from thawing, melting, or otherwise spoiling or decaying before reaching the final destination), and/or ambient temperature (e.g., based on perishable items spoiling much faster in the summer than in the winter), among other examples. For example, in FIG. 1B, reference number 150 depicts an example route where the autonomous vehicle travels to two alternative pickup locations to obtain additional items in a user's order that were unavailable at the initial pickup location before traveling to the final destination (e.g., a customer doorstep or other delivery location) to deliver the items that were obtained at multiple pickup locations.

In some implementations, when the autonomous vehicle reaches each alternative pickup location, the autonomous vehicle may communicate with one or more transaction terminals at the pickup location to enter into a transaction for one or more remaining items that are available at that location. For example, as described herein, the autonomous vehicle may communicate information related to the merchant-bound virtual credential that was generated for the current pickup location, and the items purchased from the current pickup location may be loaded into a secure compartment on the autonomous vehicle. For example, in some implementations, the autonomous vehicle may be specially designed for delivering packages, parcels, or other goods, and may include separate secure compartments to hold items that are being transported for eventual delivery. Accordingly, in some implementations, the items that are obtained from the initial pickup location and each alternative pickup location may be loaded into a separate secure compartment on the autonomous vehicle, which may reduce a fraud risk and/or a theft risk by preventing personnel at subsequent pickup locations from accessing items that were loaded onto the autonomous vehicle at previous pickup locations. In addition, in some implementations, the autonomous vehicle may have a limited internal space (e.g., limited number of secure compartments and/or limited cargo space), whereby the autonomous vehicle may calculate a remaining internal volume or capacity within the autonomous vehicle at each pickup location, including the initial pickup location. Accordingly, in some implementations, the autonomous vehicle may determine a total size of the remaining items that are to be picked up at the alternative pickup locations and may make any adjustments to the items that are obtained from each pickup location based on the remaining internal volume or capacity and the size of the remaining items to be picked up at a next alternative pickup location (e.g., only obtaining a subset of the available items that will fit within the remaining internal volume or capacity). In this way, the autonomous vehicle and the ordering system may provide capabilities to securely and efficiently fulfill an order across multiple pickup locations when one or more items ordered by the user are unavailable at an initial pickup location.

As indicated above, FIGS. 1A-1B are provided as an example. Other examples may differ from what is described with regard to FIGS. 1A-1B.

Figure 2:
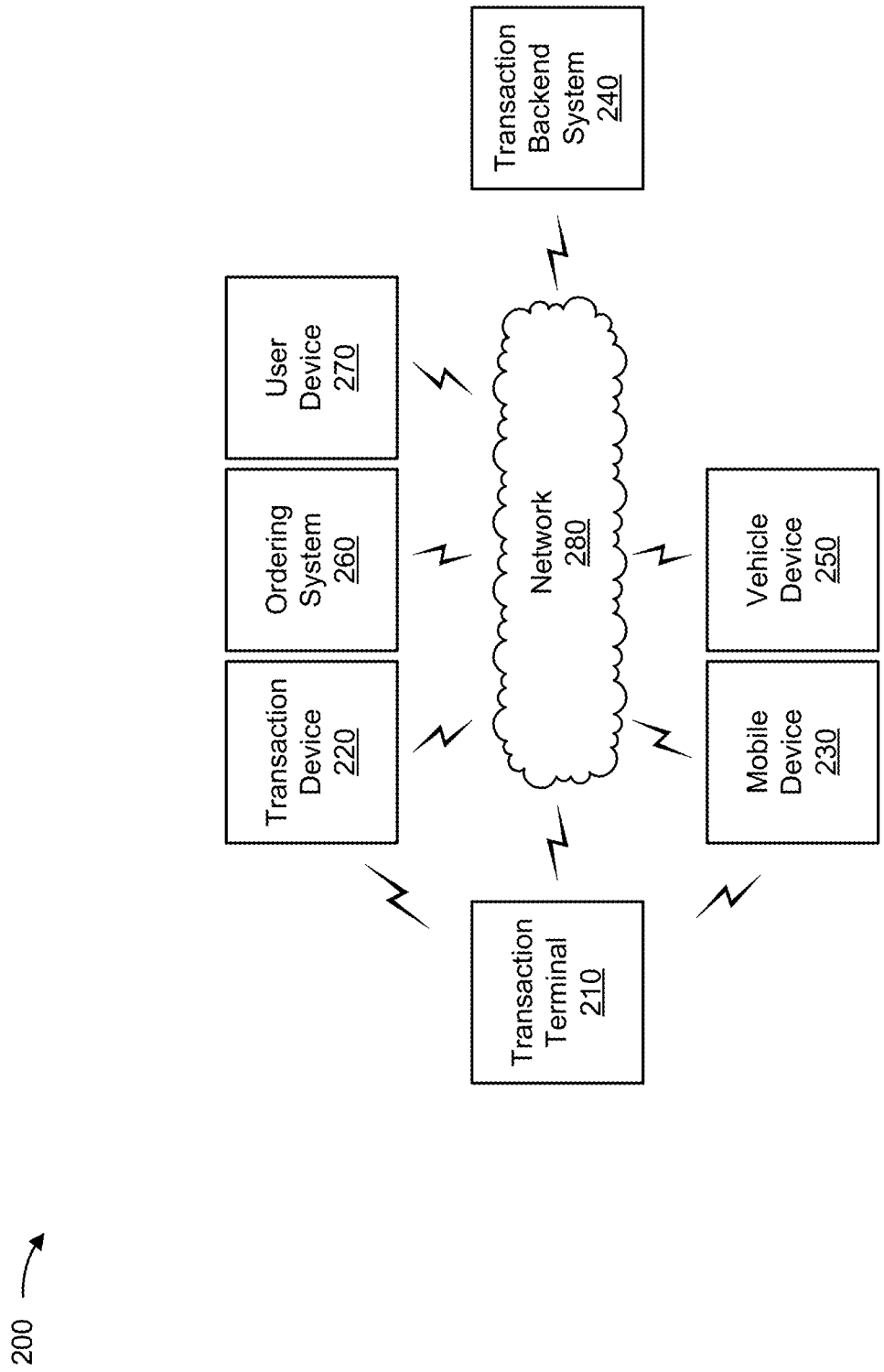
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a mobile device 230, a transaction backend system 240, a vehicle device 250, an ordering system 260, and/or network 280. Devices of environment 200 may interconnect via wired connections and/or wireless connections.

The transaction terminal 210 includes one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). In some implementations, the transaction terminal 210 includes an access control terminal (e.g., used to control physical access to a secure area), such as an access control panel used to control an access-controlled entry (e.g., a turnstile, a door, a gate, or another physical barrier, such as a physical barrier controlling access to a secure area of an autonomous vehicle). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the mobile device 230 or the vehicle device 250 or may be integrated into the mobile device 230 or the vehicle device 250. For example, the mobile device 230 or the vehicle device 250 may execute an electronic payment application capable of performing functions of the transaction device 220 described herein. Thus, one or more operations described herein as being performed by the transaction device 220 may be performed by a transaction card, the mobile device 230, the vehicle device 250, a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The mobile device 230 includes one or more devices capable of being used for an electronic transaction, as described above in connection with the transaction device 220. The mobile device 230 may include a communication device and/or a computing device. For example, the mobile device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the mobile device 230 may be capable of receiving, generating, storing, processing, and/or providing information associated with autonomous delivery vehicle decisioning to enable secure and efficient order fulfillment, as described elsewhere herein.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTER-CARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The vehicle device 250 includes one or more devices capable of receiving, generating, storing, processing, and/or providing information associated with autonomous delivery vehicle decisioning to enable secure and efficient order fulfillment, as described elsewhere herein. For example, the vehicle device 250 may include one or more sensors (e.g., an inertial measurement unit, a three-axis accelerometer, a global navigation satellite system receiver, an on-board diagnostic device, an electronic control unit, a gyroscope, a dash camera, a parking assist camera, and/or a backup assist camera, among other examples) or a similar type of device. In some implementations, the vehicle device may utilize sensory input to travel along roadways and may include or be integrated with transaction device 220 and/or mobile device 230 to conduct transactions at one or more pickup locations. In some implementations, the vehicle device 250 may receive information from and/or transmit information to the transaction terminal 210, the transaction backend system 240, the ordering system 260, and/or the user device 270.

The ordering system 260 includes one or more devices capable of receiving, generating, storing, processing, providing, and/or routing information associated with autonomous delivery vehicle decisioning to enable secure and efficient order fulfillment, as described elsewhere herein. The ordering system 260 may include a communication device and/or a computing device. For example, the ordering system 260 may include a server, such as an application server, a client server, a web server, a database server, a host server, a proxy server, a virtual server (e.g., executing on computing hardware), or a server in a cloud computing system. In some implementations, the ordering system 260 includes computing hardware used in a cloud computing environment.

The user device 270 includes one or more devices capable of receiving, generating, storing, processing, and/or providing information associated with autonomous delivery vehicle decisioning to enable secure and efficient order fulfillment, as described elsewhere herein. The user device 270 may include a communication device and/or a computing device. For example, the user device 270 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 280 includes one or more wired and/or wireless networks. For example, the network 280 may include a cellular network, a public land mobile network, a local area network, a wide area network, a metropolitan area network, a telephone network, a private network, the Internet, and/or a combination of these or other types of networks. The network 280 enables communication among the devices of environment 200. In some implementations, the transaction terminal 210 may communicate with the transaction device 220, the mobile device 230, and/or the vehicle device 250 using a first network (e.g., a contactless network or by coming into contact with the transaction device 220, the mobile device 230, and/or the vehicle device 250) and may communicate with the transaction backend system 240 and/or other suitable devices (e.g., the ordering system 260 or user device 270) using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
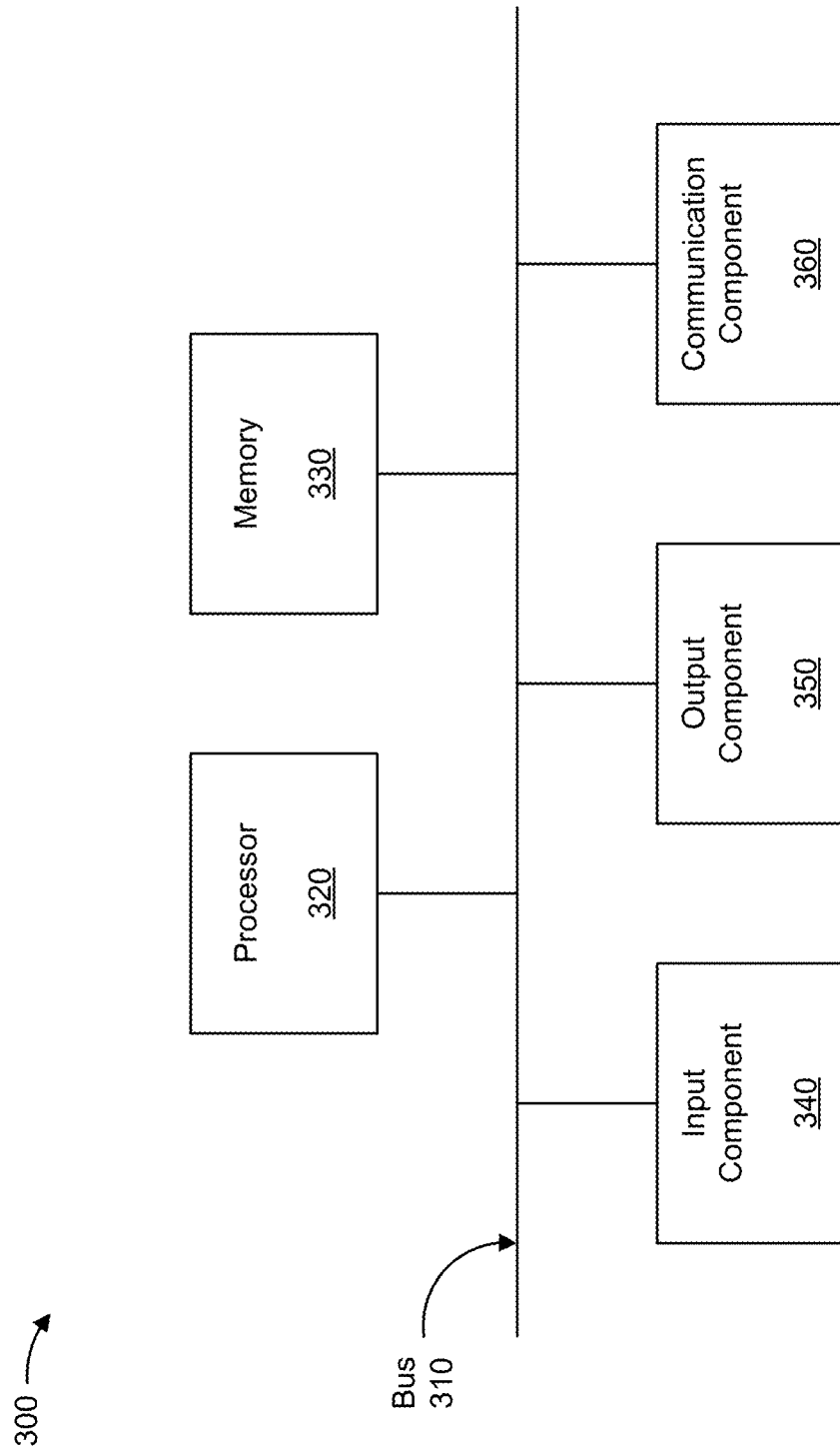
FIG. 3 is a diagram of example components of one or more devices of FIG. 2.

FIG. 3 is a diagram of example components of a device 300, which may correspond to transaction terminal 210, transaction device 220, mobile device 230, transaction backend system 240, vehicle device 250, ordering system 260, and/or user device 270. In some implementations, transaction terminal 210, transaction device 220, mobile device 230, transaction backend system 240, vehicle device 250, ordering system 260, and/or user device 270 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
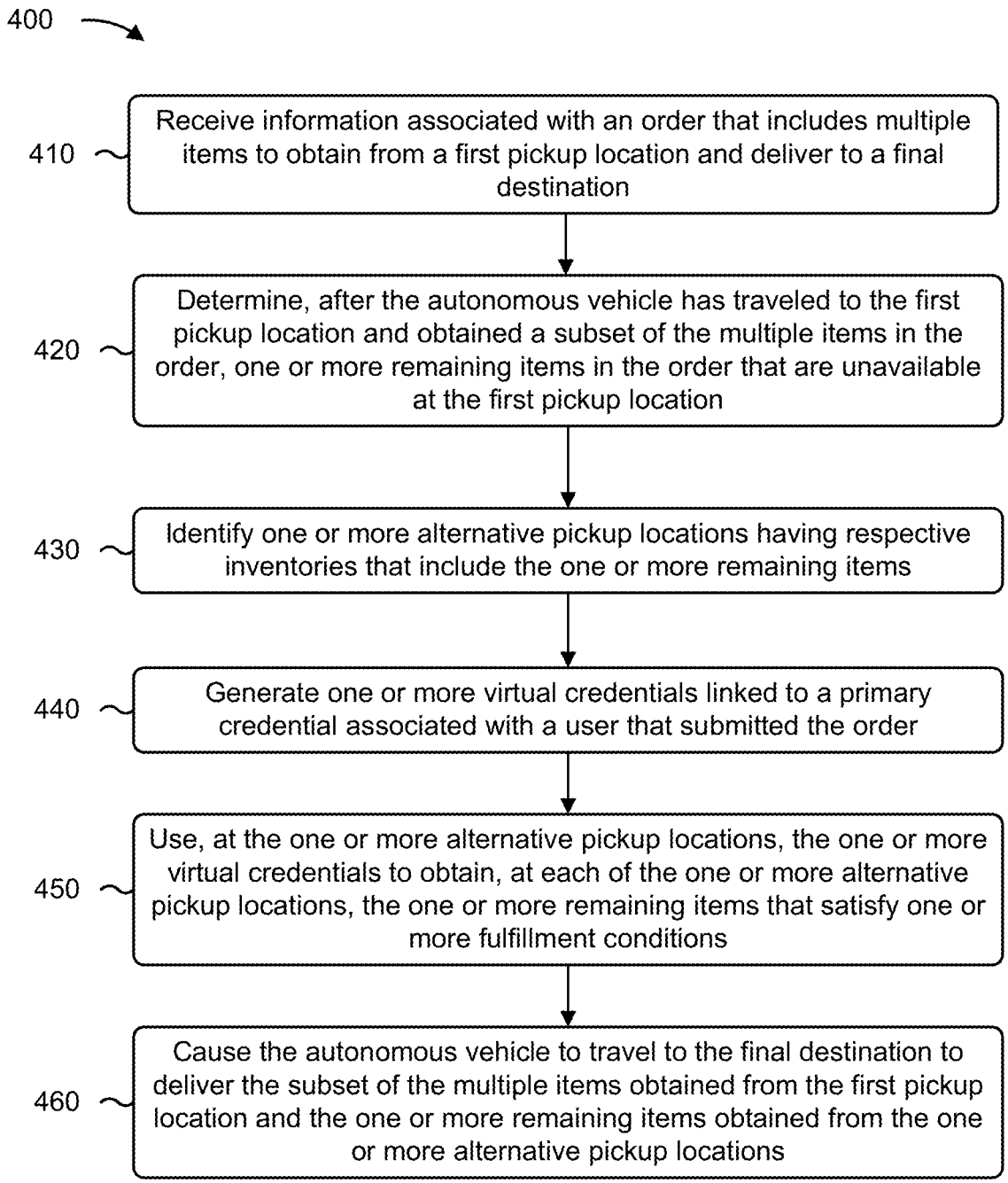
FIG. 4 is a flowchart of an example process associated with autonomous delivery vehicle decisioning to enable secure and efficient order fulfillment.

FIG. 4 is a flowchart of an example process 400 associated with autonomous delivery vehicle decisioning to enable secure and efficient order fulfillment. In some implementations, one or more process blocks of FIG. 4 may be performed by an autonomous vehicle system (e.g., transaction device 220, mobile device 230, and/or vehicle device 250). In some implementations, one or more process blocks of FIG. 4 may be performed by another device or a group of devices separate from or including the autonomous vehicle system, such as transaction terminal 210, transaction backend system 240, ordering system 260, and/or user device 270. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving information associated with an order that includes multiple items to obtain from a first pickup location and deliver to a final destination (block 410). As further shown in FIG. 4, process 400 may include determining, after the autonomous vehicle has traveled to the first pickup location and obtained a subset of the multiple items in the order, one or more remaining items in the order that are unavailable at the first pickup location (block 420). As further shown in FIG. 4, process 400 may include identifying one or more alternative pickup locations having respective inventories that include the one or more items remaining items (block 430). As further shown in FIG. 4, process 400 may include generating one or more virtual credentials linked to a primary credential associated with a user that submitted the order (block 440). As further shown in FIG. 4, process 400 may include using, at the one or more alternative pickup locations, the one or more virtual credentials to obtain, at each of the one or more alternative pickup locations, the one or more remaining items that satisfy one or more fulfillment conditions (block 450). As further shown in FIG. 4, process 400 may include causing the autonomous vehicle to travel to the final destination to deliver the subset of the multiple items obtained from the first pickup location and the one or more remaining items obtained from the one or more alternative pickup locations (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system associated with an autonomous vehicle for secure and efficient order fulfillment, the system comprising:
one or more memories; and
one or more processors, communicatively coupled to the one or more memories, configured to:
receive information associated with an order that includes multiple items to obtain from a first pickup location and deliver to a final destination;
determine, after the autonomous vehicle has traveled to the first pickup location and obtained a subset of the multiple items in the order, one or more remaining items in the order that are unavailable at the first pickup location;
identify one or more alternative pickup locations having respective inventories that include the one or more remaining items;
generate one or more virtual credentials linked to a primary credential associated with a user that submitted the order,
wherein the one or more virtual credentials are one or more merchant-bound secure payment credentials that are associated with a primary payment credential, provided by the user, and that are used as a substitute for the primary payment credential, and
wherein each virtual credential, of the one or more virtual credentials, is valid only for a respective merchant associated with a respective alternative pickup location;
use, at the one or more alternative pickup locations, the one or more virtual credentials in one or more financial transactions to obtain, at each of the one or more alternative pickup locations, the one or more remaining items that satisfy one or more fulfillment conditions; and
cause the autonomous vehicle to travel to the final destination to deliver the subset of the multiple items obtained from the first pickup location and the one or more remaining items obtained from the one or more alternative pickup locations.

2. The system of claim 1, wherein the one or more fulfillment conditions are satisfied based on the one or more remaining items having respective costs that do not exceed maximum values that are based on costs of the one or more items at the first pickup location.

3. The system of claim 1, wherein the one or more fulfillment conditions are satisfied based on the one or more remaining items corresponding to authorized substitutions for the one or more items that are unavailable at the first pickup location.

4. The system of claim 1, wherein the one or more virtual credentials are bound to be used only with entities that are associated with the one or more alternative pickup locations.

5. The system of claim 1, wherein the one or more processors are further configured to:
send, to the user, a message indicating that the one or more virtual credentials were generated to enable transactions at the one or more alternative pickup locations; and
receive, from the user, a response to the message to approve or adjust one or more parameters associated with using the one or more virtual credentials to obtain the one or more remaining items from the one or more alternative pickup locations.

6. The system of claim 1, wherein the one or more processors are further configured to:
calculate an optimal route to travel from the first pickup location to the one or more alternative pickup locations before traveling to the final destination; and
cause the autonomous vehicle to travel from the first pickup location to the one or more alternative pickup locations along the optimal route.

7. The system of claim 1, wherein the one or more processors, to identify the one or more alternative pickup locations, are configured to:
identify the one or more alternative pickup locations based on a geofence that defines a limited area within which the autonomous vehicle is permitted to travel.

8. The system of claim 1, wherein the one or more processors are further configured to:
calculate, at one or more of the first pickup location or an alternative pickup location of the one or more alternative pickup locations, a remaining internal capacity within the autonomous vehicle; and
selectively cause the autonomous vehicle to travel to a next pickup location, of the one or more alternative pickup locations, based on whether the one or more remaining items available at the next pickup location have a size that fits within the remaining internal capacity within the autonomous vehicle.

9. The system of claim 1, wherein the autonomous vehicle includes separate secure areas and the subset of the multiple items obtained from the first pickup location and the one or more items obtained from each of the one or more alternative pickup locations are loaded into the separate secure areas of the autonomous vehicle.

10. A method for secure and efficient order fulfillment, comprising:
receiving, by an autonomous vehicle system, information associated with an order that includes multiple items to deliver to a final destination;
identifying, by the autonomous vehicle system, at least a first pickup location having an inventory that includes one or more first items in the order and a second pickup location having an inventory that includes one or more second items in the order;
generating, by the autonomous vehicle system, at least a first virtual credential and a second virtual credential linked to a primary credential associated with a user that submitted the order,
wherein the first virtual credential and the second virtual credential are merchant-bound secure payment credentials that are associated with a primary payment credential, provided by the user, and that are used as a substitute for the primary payment credential, wherein the first virtual credential is bound to only a first merchant associated with the first pickup location and the second virtual credential is bound only to a second merchant associated with the second pickup location;

using, by the autonomous vehicle system, at the first pickup location, the first virtual credential in a financial transaction to obtain, at the first pickup location, the one or more first items in the order;

using, by the autonomous vehicle system, at the second pickup location, the second virtual credential in a financial transaction to obtain, at the second pickup location, the one or more second items in the order; and causing, by the autonomous vehicle system, an autonomous vehicle to travel to the final destination to deliver the one or more first items obtained from the first pickup location and the one or more second items obtained from the second pickup location.

11. The method of claim 10, wherein the one or more first items are obtained from the first pickup location and the one or more second items are obtained from the second pickup location based on the one or more first items and the one or more second items having respective costs that do not exceed maximum values defined by the user.

12. The method of claim 10, further comprising:
sending, to the user, a message indicating that the first virtual credential and the second virtual credential were generated to enable transactions at the first pickup location and the second pickup location, respectively; and
receiving, from the user, a response to the message to adjust one or more parameters associated with using the first virtual credential at the first pickup location or using the second virtual credential at the second pickup location.

13. The method of claim 10, further comprising:
calculating an optimal route to travel to the first pickup location and the second pickup location before traveling to the final destination; and
causing the autonomous vehicle to travel along the optimal route to the first pickup location and the second pickup location.

14. The method of claim 10, wherein the first pickup location and the second pickup location are within a geofence that defines a limited area within which the autonomous vehicle is permitted to travel.

15. The method of claim 10, further comprising:
calculating, at the first pickup location, a remaining internal capacity within the autonomous vehicle; and
causing the autonomous vehicle to travel to the second pickup location based on the one or more second items available at the second pickup location having a size that fits within the remaining internal capacity within the autonomous vehicle.

16. The method of claim 10, wherein the one or more first items obtained from the first pickup location and the one or more second items obtained from the second pickup location are loaded into separate secure areas of the autonomous vehicle.

17. A non-transitory computer-readable medium storing a set of instructions, the set of instructions comprising:
one or more instructions that, when executed by one or more processors of an autonomous vehicle system, cause the autonomous vehicle system to:
receive information associated with an order that includes multiple items that an autonomous vehicle is to obtain and deliver to a final destination;
determine, after the autonomous vehicle has traveled to a first pickup location and obtained a subset of the multiple items in the order, one or more remaining items in the order that are unavailable at the first pickup location;
identify a second pickup location having an inventory that includes the one or more remaining items;
generate a virtual credential linked to a primary credential associated with a user that submitted the order,
wherein the virtual credential is a merchant-bound secure payment credential that is associated with a primary payment credential, provided by the user, and that is used as a substitute for the primary payment credential, and
wherein the virtual credential is valid only for a merchant associated with the second pickup location;
use, at the second pickup location, the virtual credential in a financial transaction to obtain the one or more remaining items from the inventory of the second pickup location; and
cause the autonomous vehicle to travel to the final destination to deliver the subset of the multiple items obtained from the first pickup location and the one or more remaining items obtained from the second pickup location.

18. The non-transitory computer-readable medium of claim 17, wherein the one or more remaining items are obtained from the second pickup location based on the one or more remaining items in the inventory of the second pickup location satisfying one or more fulfillment conditions.

19. The non-transitory computer-readable medium of claim 17, wherein the virtual credential is bound to be used with only an entity associated with the second pickup location.

20. The non-transitory computer-readable medium of claim 17, wherein the one or more instructions, when executed by the one or more processors of the autonomous vehicle system, further cause the autonomous vehicle system to:
send, to the user, a message indicating that the virtual credential was generated to enable a transaction at the second pickup location; and
receive, from the user, a response to the message to approve or adjust one or more parameters associated with using the virtual credential to obtain the one or more remaining items from the inventory of the second pickup location.

* * * * *